Nov. 6, 1928.  1,690,773
R. G. DONALDSON
AIRSHIP
Filed Dec. 4, 1926  4 Sheets-Sheet 1

Inventor
R. G. Donaldson
Ch. Parker
Attorney

Nov. 6, 1928.
R. G. DONALDSON
AIRSHIP
Filed Dec. 4, 1926
1,690,773
4 Sheets-Sheet 2
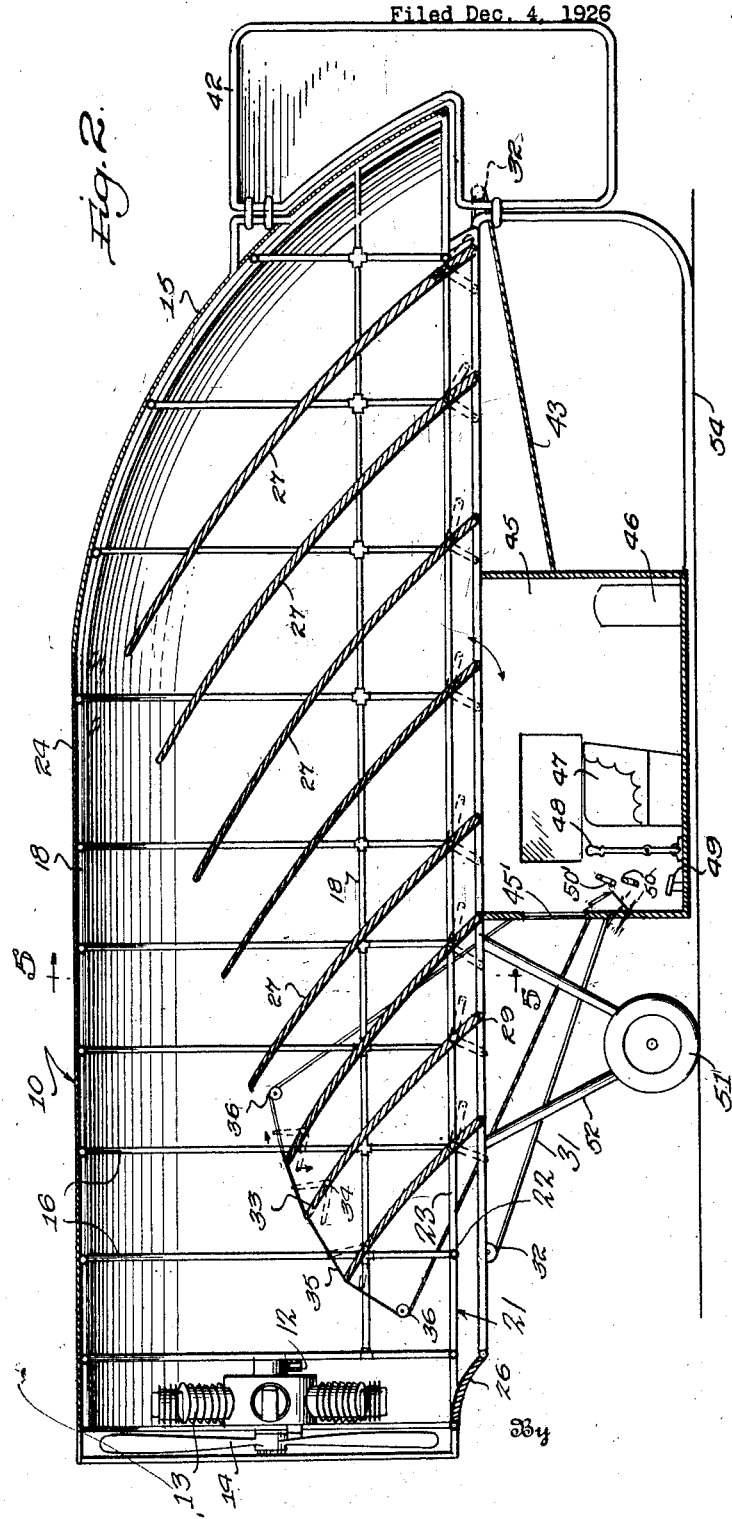
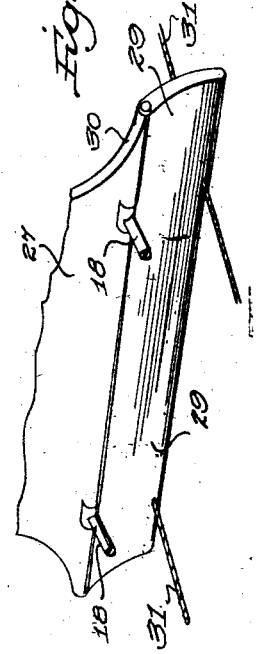
Inventor
R. G. DONALDSON
By
Attorney

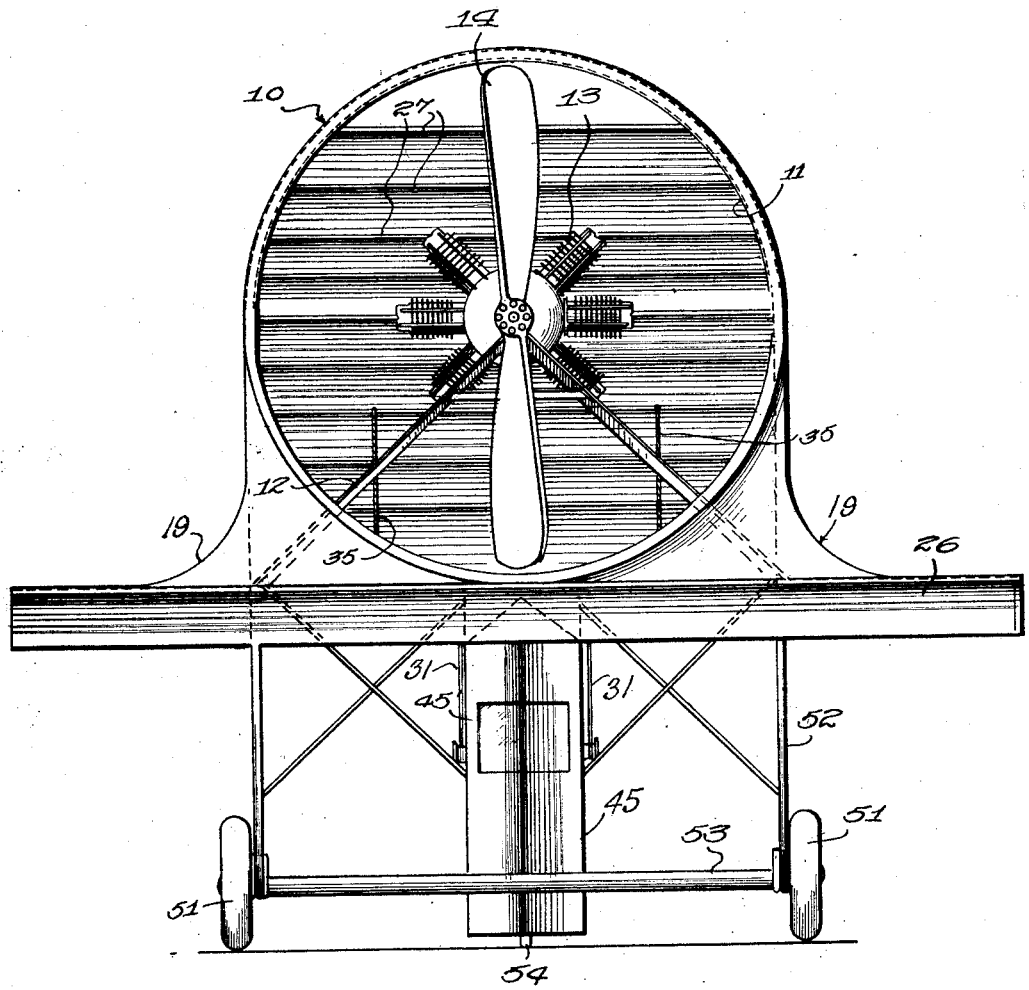

Nov. 6, 1928.  1,690,773
R. G. DONALDSON
AIRSHIP
Filed Dec. 4, 1926   4 Sheets-Sheet 4
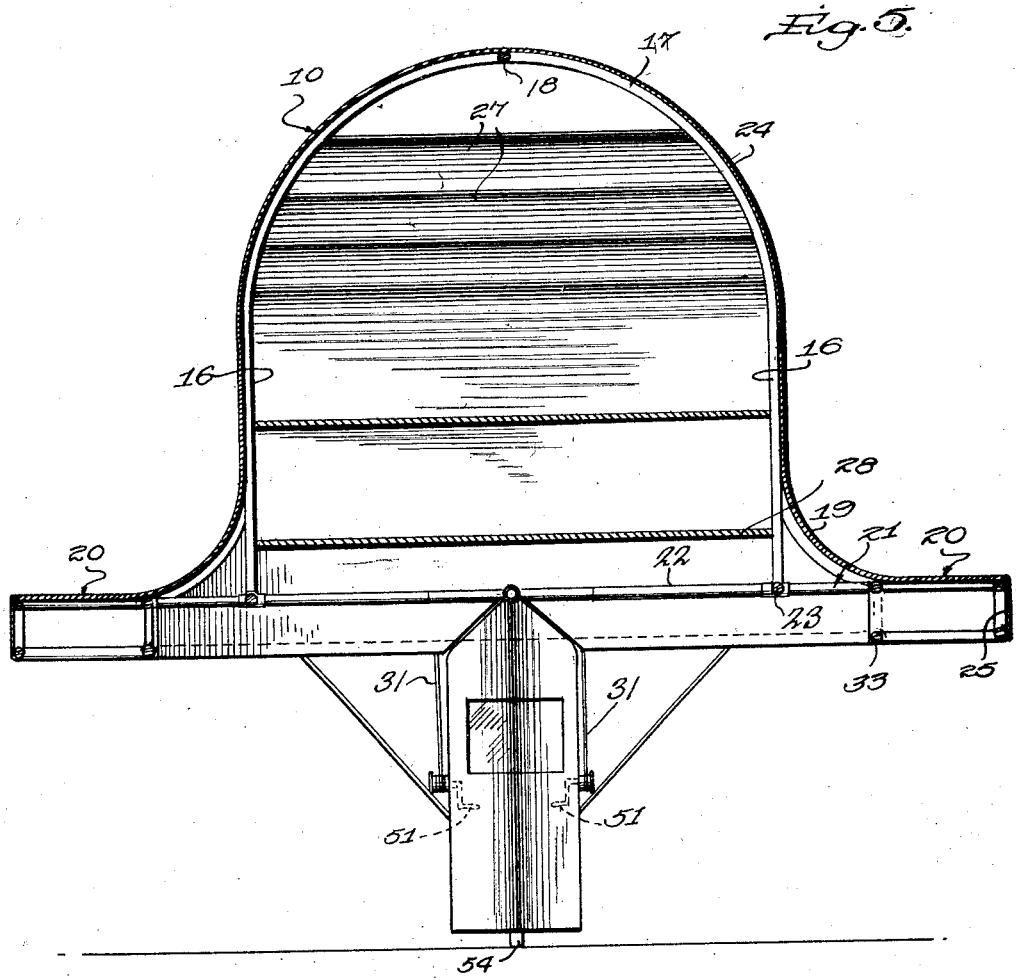
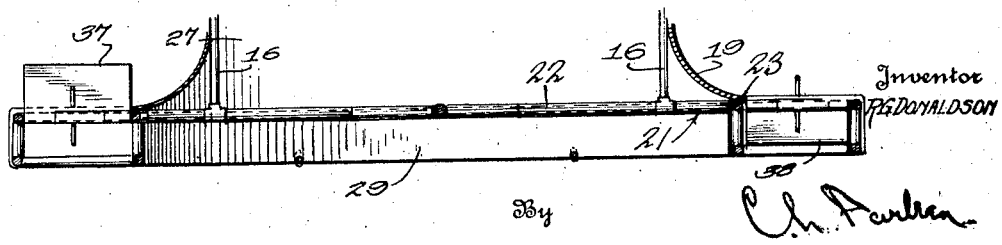

Patented Nov. 6, 1928.

1,690,773

UNITED STATES PATENT OFFICE.

ROY G. DONALDSON, OF CRESTLINE, OHIO.

AIRSHIP.

Application filed December 4, 1926. Serial No. 152,702.

This invention relates to aircraft of the heavier-than-air type.

An important object of the invention is to provide an aircraft which is adapted to ascend and descend substantially vertically after the manner of the helicopter type of aircraft, but embodying principles of operation entirely different from such a type of aircraft.

A further object is to provide an aircraft of the type referred to wherein the elevating and sustaining action is obtained with a marked increase in propeller efficiency.

A further object is to provide an aircraft of the type referred to wherein a propeller rotating about a horizontal axis is employed, and the air currents impelled therefrom are controlled in such a manner as to effect either a direct vertical sustaining action or a composite sustaining and longitudinal propelling action whereby the aircraft is adapted to ascend and descend vertically and which is adapted to be propelled horizontally through the air.

A further object is to provide a substantially horizontal body or tunnel having means in the forward end thereof for impelling air rearwardly into the tunnel, and to provide distributing means whereby the air currents may be controlled in such a manner as to effect a sustaining action and a horizontal propelling action.

A further object is to provide an aircraft of the character just mentioned wherein the distributing means referred to is readily controllable for varying the effects of the air currents discharged therefrom whereby either a vertical sustaining action or a composite sustaining action and horizontal propelling action readily may be obtained.

A further object is to provide an aircraft of the character referred to wherein the distributing means is further provided with controllable means for varying the distribution of air through the distributing means to vary the sustaining action according to the distribution of weight carried by the aircraft.

A further object is to provide an aircraft employing a substantially horizontal body or tunnel having means for impelling air rearwardly thereinto and to provide a series of distributors substantially angularly arranged within the body and having their upper ends arranged at progressively increasing heights toward the rear end of the body to intercept and distribute the impelled air generally in a downward direction, and to provide means associated with the distributors for discharging the impelled air substantially vertically or rearwardly at an angle to the vertical.

A further object is to provide an aircraft of the character just referred to wherein the body is provided with laterally projecting sustaining planes and wherein such planes are provided with ailerons to permit the craft readily to be balanced transversely.

A further object is to provide an aircraft of the character referred to wherein the body is provided beneath its forward end with a transverse elevating plane Other objects and advantages of the invention will become apparent during the course of the following description.

In the drawings I have shown one embodiment of the invention. In this showing,

Figure 2 is a central vertical longitudinal sectional view,

Figure 3 is a fragmentary perspective of one of the distributor controls,

Figure 4 is a front elevation,

Figure 5 is a transverse section taken substantially on line 5—5 of Figure 2, and, Figure 6 is a fragmentary transverse sectional view similar to Figure 5 taken through the ailerons.

Figure 1:
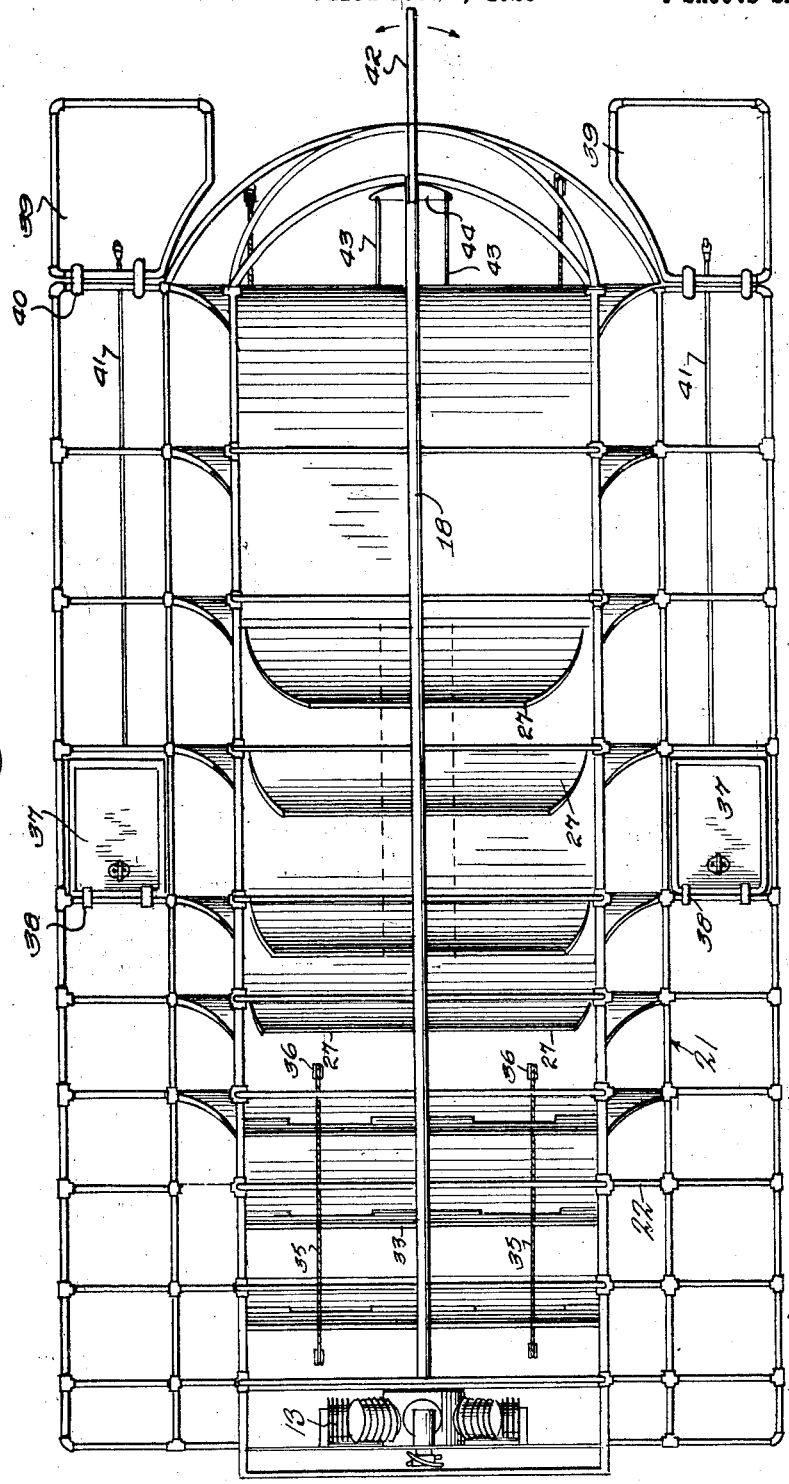
Figure 1 is a plan view showing the covering removed.

Referring to the drawings the numeral 10 designates the body portion of the apparatus the forward end of which is substantially circular as indicated at 11. A supporting frame 12 is arranged at the forward end of the body and a suitable motor 13 is mounted at the upper end of the frame and is adapted to drive a suitable propeller 14. It will be noted that the body 10 forms substantially a tunnel, and the rear end thereof is curved downwardly as at 15. The body may be formed of a plurality of frame members 16 the upper ends of which are semi-circular as indicated at 17 (see Figure 5) and these frame members may be formed of any suitable material such as duralumin and may be made as rods, tubes, or the like. The frame members 16 extend transversely of the body, as shown, and may be suitably braced by longitudinal frame members 18.

The lower portion of the body flares outwardly on opposite sides as at 19 and terminates in opposite longitudinally extending supporting plane portions indicated as a whole by the numeral 20. These lower portions of the apparatus are constructed upon a suitable frame work 21 formed of frame members similar to those previously described. The lower frame work includes transverse frame members 22 and longitudinal frame members 23. The upper portion of the body 10, the flared portions 19 and the sustaining plane portions 20 are covered with suitable airplane covering material 24 as shown in Figure 5, and this material preferably extends downwardly over the edges of the sustaining plane as indicated at 25.

Beneath the forward end of the apparatus, a transverse lifting plane 26 is provided. This plane extends throughout the width of the forward end of the apparatus as indicated in Figure 4, and is preferably curved as clearly shown in Figure 2. This plane is provided for effecting a lifting action for the forward end of the appartus as it is moving longitudinally through the air.

The entire lower portion of the body and sustaining planes are open as clearly shown in Figure 2, and means are provided for distributing downwardly, downwardly and rearwardly, or forwardly the air impelled through the body or tunnel 10. As shown in Figure 2, a pluarality of distributors 27 are arranged angularly within the body. These distributors are arranged to extend downwardly toward the rear end of the apparatus to deflect the impelled air in such direction. In order to permit the distributors to intercept proper proportions of the impelled air, the upper edges thereof are arranged at progressively increasing heights as shown in Figure 2. The distributors have their lower ends flared outwardly as at 28, and the lower edges of the distributors terminate at the outer edges of the flared portion 19, that is, at the inner extremities of the sustaining planes 20 whereby there is a continuous sustaining surface provided throughout the length of the apparatus.

The distribution of air is adapted to be controlled to vary the angle at which the air is discharged from the bottom of the apparatus. This distribution may be effected in any desired manner, and in the present instance I have shown the lower extremities of the distributors as constituting separate members 29 hinged to the adjacent portions of the distributors as at 30. The control members 29 have their lower portions connected by cables 31 which pass around pulleys 32. Obviously movement of the cables longitudinally is adapted to vary the angles of the control members 29.

Means also are provided for varying the proportions of air delivered to the forward and rear distributors to control the sustaining action throughout the length of the aircraft. As shown in Figure 2, the upper extremities of several of the distributors may be provided with movable portions 33 hinged to the adjacent portions of the distributors as at 34. The extremities of the movable members 33 also are connected by cables 35 which pass around pulleys 36.

Means are provided for effecting transverse stabilization of the aircraft, and for this purpose ailerons 37 are provided in the sustaining planes as clearly shown in Figures 1 and 6. These ailerons are pivotally connected as at 38 with certain of the frame members 21. These ailerons are adapted to be controlled in such a manner that elevation of one of them is adapted to depress the other so that a lifting action will be delivered to one side of the apparatus simultaneously with a depressing action at the opposite side. Elevators 39 are pivotally connected as at 40 to the rear end of the aircraft to perform their usual functions. The elevators may be controlled by cables 41. A steering rudder 42 is arranged centrally of the rear end of the apparatus and may be controlled by cables 43 connected to a tiller 44.

A pilot or control house 45 is arranged beneath the body of the apparatus substantially centrally thereof and is provided with an observation window 45' in its forward end. A fuel tank 46 may be arranged in the control house and the latter is provided with a seat 47 for the operator. A joy stick 48 is mounted forwardly of the driver's seat. This member is movable in one direction to control the ailerons 37 and in another direction to control the elevators 39. The structure and operation of the joy stick is well understood in the art and need not be referred to in detail. A steering pedal 49 is connected to the cables 43 in the usual manner. Operation of the cables 35 is adapted to be effected by a crank 50 in any desired manner, while the cables 31 are adapted to be operated by a second crank 51'.

As shown in Figures 2 and 4, wheels 51 are arranged beneath the forward portion of the craft, forwardly of the control house and are secured to the body of the craft by braces 52. These wheels are arranged adjacent opposite sides of the craft and may be connected by an axle 53. When the craft is resting upon the ground these wheels coact with a rear skid 54 to provide supporting means.

The operation of the aircraft is as follows:

When it is desired to ascend, the crank 51' is operated to swing the control members 29 to vertical positions, or to positions wherein the bottoms of the control members are inclined forwardly. Operation of the motor projects air rearwardly into the body or tunnel, and this air is intercepted by the distributors 27. As previously stated, the upper edges of the distributors are arranged at progressively increasing heights toward the rear end of the body and each is adapted to intercept the proper porportion of air according to the weight to be lifted at the bottom portion of the apparatus corresponding thereto. The design of the distributors and the locations of the upper edges thereof will, of course, be dependent upon the distribution of weight carried by the vehicle, and more particularly will depend upon the location of the motor. It will be understood that the latter may be arranged in the control house if desired, in which case a smaller proportion of air will be intercepted by the forward distributors. When the action above referred to takes place, the distributors will cause the air to be projected downwardly and rearwardly, while the control members 29 will further deflect the air in a substantially vertical direction thus effecting a direct vertical lifting action. When the desired elevation has been attained, the joy stick is operated to swing the control members 29 rearwardly, whereupon air will be discharged downwardly and rearwardly. The reaction created by the discharge of the air when the control members are arranged vertically will be in a vertical direction to effect direct vertical elevation of the ship, and when the control members are arranged in the solid line position shown in Figure 2, there will be a composite vertical and longitudinal reactionary effect provided which will sustain the craft and cause it to move longitudinally. The ailerons are adapted to be operated in the usual manner to provide transverse stability, while the elevators and rudder are operated to tilt the craft longitudinally, and to effect steering thereof. As previously stated, the ailerons are adapted to be operated in such a manner that one of them will be elevated simultaneously with the depression of the other, and this action not only stabilizes the craft but also "banks" the craft when turning.

The proportion of air intercepted by the distributors as a whole may be varied by operating the hinged members 33. If it is found that the craft tends to dip at its forward end, the members 33 may be swung upwardly and rearwardly by operating the crank 50 whereby a greater proportion of air will be intercepted by the forward distributors thus effecting a greater lifting action at the forward end of the craft. Similarly, the members 33 may be swung downwardly and forwardly to correct too great a dipping action at the rear end of the apparatus. While I have illustrated only the forward distributors as being provided with the members 33, it will be obvious that any number of the distributors may be provided with such control means.

The lifting plane 26 serves to effect a lifting action at the forward end of the craft while traveling in a longitudinal direction, and the sustaining planes serve to supplement the vertical reaction of the discharged air from the distributors in sustaining the craft. It will be obvious that when the control members 29 are swung from vertical to rearwardly inclined positions, the resultant vertical reaction will be decreased, and the provision of the sustaining planes balances this decrease in vertical lifting force.

The arrangement of the axis of the propeller horizontally and the placing of the propeller in the opening in the forward end of the tunnel serves to greatly increase the efficiency of the propeller by preventing radial and longitudinal slippage, and accordingly the impelling action of the apparatus described is considerably more efficient than the lifting action obtained with the usual helicopter constructions.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. An aircraft comprising a tunnel having an opening in its forward end, a propeller mounted adjacent said opening to impel air rearwardly into said tunnel, said tunnel having a horizontally elongated bottom opening substantially throughout its length for the discharge of air from said tunnel, and means for distributing air from said tunnel substantially throughout the area of said bottom opening for discharge therethrough.

2. An aircraft comprising a tunnel having an opening in its forward end, a propeller mounted adjacent said opening to impel air rearwardly into said tunnel, said tunnel having a horizontally elongated bottom opening for the discharge of air from said tunnel, means for distributing air from said tunnel substantially throughout the area of said bottom opening for discharge therethrough, and means for controlling the direction of discharge of air from said bottom opening.

3. An aircraft comprising a tunnel having an opening in its forward end, a propeller mounted adjacent said opening to impel air rearwardly into said tunnel, said tunnel having a horizontally elongated bottom opening for the discharge of air from said tunnel, a plurality of distributing vanes arranged in said tunnel and adapted to deflect air in said tunnel downwardly through said bottom opening, and means for controlling the direction of discharge of air from said bottom opening.

4. An aircraft comprising a tunnel having an opening in its forward end, a propeller mounted adjacent said opening to impel air rearwardly into said tunnel, said tunnel having a horizontally elongated bottom opening for the discharge of air from said tunnel, a plurality of distributing vanes arranged in said tunnel and adapted to deflect air in said tunnel downwardly through said bottom opening, and controlling members associated with the lower extremities of said distributing vanes for controlling the direction of discharge of air from said bottom opening.

5. An aircraft comprising a horizontally elongated tunnel having an opening in its forward end, a propeller arranged in said opening to impel air rearwardly into said tunnel, said tunnel having a bottom discharge opening extending throughout a substantial portion of its length, and a plurality of distributors mounted in said tunnel and inclined downwardly and rearwardly, the upper edges of said distributors being arranged at progressively increasing heights toward the rear end of said tunnel, the lower edges of said distributors being arranged adjacent said bottom opening to discharge air therethrough.

6. An aircraft comprising a horizontally elongated tunnel having an opening in its forward end, a propeller arranged in said opening to impel air rearwardly into said tunnel, said tunnel having a bottom discharge opening extending throughout a substantial portion of its length, a plurality of distributors mounted in said tunnel and having their upper edges arranged at progressively increasing heights toward the rear end of said tunnel, the lower edges of said distributors being inclined downwardly and rearwardly to discharge air through said bottom opening, and control members pivotally connected at their upper edges to the lower extremities of said distributors and adapted to control the direction of discharge of air from said bottom opening.

7. An aircraft comprising a horizontally elongated tunnel having an opening in its forward end, a propeller arranged in said opening to impel air rearwardly into said tunnel, said tunnel having a bottom discharge opening extending throughout a substantial portion of its length, a plurality of distributors mounted in said tunnel and having their upper edges arranged at progressively increasing heights toward the rear end of said tunnel, the lower edges of said distributors being inclined downwardly and rearwardly to discharge air through said bottom opening, control members pivotally connected at their upper edges to the lower extremities of said distributors and adapted to control the direction of discharge of air from said bottom opening, and a pair of longitudinal sustaining planes arranged on opposite sides of said tunnel substantially parallel thereto.

8. An aircraft comprising a tunnel having an opening in its forward end, a propeller mounted adjacent said opening to impel air rearwardly into said tunnel, said tunnel having a horizontally elongated bottom opening for the discharge of air from said tunnel, a plurality of distributing vanes arranged in said tunnel and adapted to deflect air in said tunnel downwardly through said bottom opening, means for controlling the direction of discharge of air from said bottom opening, and means for controlling the proportion of air intercepted by certain of said distributing vanes.

9. An aircraft comprising a horizontally elongated tunnel having an opening in its forward end, a propeller arranged in said opening to impel air rearwardly into said tunnel, said tunnel having a bottom discharge opening extending throughout a substantial portion of its length, a plurality of distributors mounted in said tunnel and inclined downwardly and rearwardly, the upper edges of said distributors being arranged at progressively increasing heights toward the rear end of said tunnel, the lower edges of said distributors being arranged adjacent said bottom opening to discharge air therethrough, and means for controlling the proportion of air intercepted by certain of said distributors.

10. An aircraft comprising a horizontally elongated tunnel having a tranvsersely curved top wall, the lower portions of the side walls of said tunnel being flared outwardly, said tunnel beneath said flared portions being substantially entirely open, a plurality of distributors arranged within said tunnel and spaced from each other, said distributors having their upper edges arranged at progressively increasing heights toward the rear end of said tunnel, the lower portions of said distributors being inclined downwardly and rearwardly, the forward end of said tunnel being provided with a circular opening, a propeller mounted in said opening to impel air rearwardly into said tunnel whereby it will be proportionately intercepted by said distributors, and means for varying the direction of discharge of air from the open lower portion of said tunnel.

In testimony whereof I affix my signature.

ROY G. DONALDSON.